April 26, 1966   A. D'ONOFRIO   3,247,718
DIGITAL OUTPUT PRESSURE TRANSDUCER
Filed Feb. 1, 1963   3 Sheets-Sheet 1

INVENTOR
Anthony D'Onofrio
BY
Spencer, Rockwell & Bartholow
ATTORNEYS

April 26, 1966 A. D'ONOFRIO 3,247,718
DIGITAL OUTPUT PRESSURE TRANSDUCER
Filed Feb. 1, 1963 3 Sheets-Sheet 2

INVENTOR
Anthony D'Onofrio

BY Spencer, Rockwell & Bartholow
ATTORNEYS

INVENTOR
Anthony D'Onofrio
BY Spencer, Rockwell & Bartholow
ATTORNEYS

United States Patent Office 3,247,718
Patented Apr. 26, 1966

3,247,718
DIGITAL OUTPUT PRESSURE TRANSDUCER
Anthony D'Onofrio, West Hartford, Conn., assignor to Pratt & Whitney Inc., West Hartford, Conn.
Filed Feb. 1, 1963, Ser. No. 255,550
11 Claims. (Cl. 73—398)

This invention relates to pressure measuring devices and more particularly to pressure-to-frequency transducing apparatus.

The present invention utilizes the pressure sensitivity of a tunnel diode to measure pressure. The pressure sensitivity of the current-voltage (I–E) characteristic of tunnel diodes has been disclosed by W. P. Mason in Electronics, vol. 35, No. 8, February 23, 1962, p. 35. Oscillator circuits which utilize the pressure sensitive characteristics of a tunnel diode to produce a variable frequency output proportional to a hydrostatic pressure to which the tunnel diode is subjected have been investigated. However, these circuits have suffered from inherent inaccuracies due to the effect of the shunt capacitance of the tunnel diode at higher frequencies, and where the proposed circuits operate on the negative conductance portion of the diode characteristic, the stability of the oscillator is not good, inasmuch as the conductance is not single valued with changes in pressure.

The present invention provides a new and improved oscillator circuit of the relaxation type, utilizing a tunnel diode in a switching mode which produces a varying frequency output accurately proportional to changes in pressure to which the tunnel diode is subjected. In the oscillator circuits here provided the shunt capacitance of the tunnel diode does not affect the frequency of the oscillator circuit, nor does the voltage dependent-negative conductance characteristic of the tunnel diode have any effect on the stability of the oscillator.

Accordingly, an object of this invention is to provide a new and improved pressure measuring apparatus.

Another object of this invention is to provide a new and improved oscillator circuit which produces an output signal of a frequency or repetition rate which is accurately proportional to pressure.

A further object of this invention is to provide a new and improved pressure measuring network utilizing the pressure sensitive characteristics of a tunnel diode.

A still further object of the invention is to provide a new and improved pressure-to-frequency transducing arrangement wherein the characteristics of a tunnel diode are utilized to set the frequency of a relaxation type oscillator in accordance with the hydrostatic pressure to which the tunnel diode is subjected.

The invention comprises the features of construction, combinations of elements, and arrangement and operative relationship of elements which will be exemplified in the apparatus and network hereinafter set forth. The scope of the invention will be indicated in the claims.

For a fuller understanding of the nature and objects of the invention, reference should be had to the following detailed description taken in connection with the accompanying drawings, in which.

Figure 1:
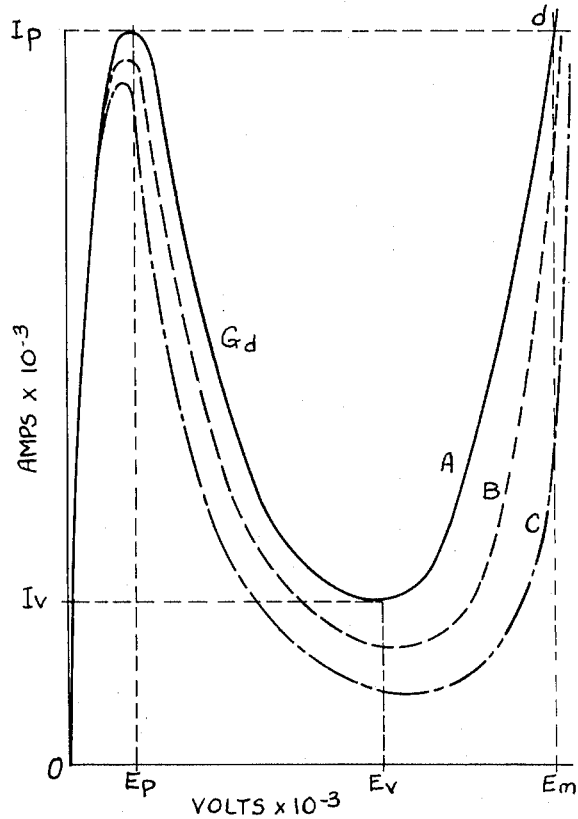
FIG. 1 illustrates typical current-voltage characteristics of a tunnel diode, showing the pressure sensitivity of the tunnel diode.

Reference is first made to the current-voltage (I–E) characteristic of a tunnel diode illustrated in FIG. 1. Curve A represents the current-voltage characteristics of a germanium tunnel diode at atmospheric pressure. The peak current and voltage occurring at the peak current are designated $I_p$ and $E_p$, respectively. The negative conductance $G_d$ is the slope of the I–E tunnel diode characteristic between $I_p$ and $I_V$, where $I_V$ is the valley current or low current state and $E_V$ is the valley voltage.

The change in the I–E characteristic represented by curves B and C results from the application of hydrostatic pressure to the tunnel diode. Applied pressure stresses the semiconductor affecting the energy gap and effective mass (ratio of the effective mass of the electron to its mass in the free space) which are related to the tunneling probability. The tunneling probability is related to the current through the junction resulting in the change in the I–E characteristic.

The present invention utilizes the I–E characteristic of the tunnel diode to provide a pressure sensitive, current responsive switch. The peak current $I_P$ and the valley current $I_V$ are the key switching points. The tunnel diode is a current responsive device. If the current through the tunnel diode reaches the peak value $I_P$ the diode voltage increases to correspond with the point $d$ at voltage $E_M$ on the I–E characteristic. When the voltage across the tunnel diode decreases or is reduced to below the value of the valley voltage $E_V$ the tunnel diode switches back to a low voltage state between 0 and $E_p$. A current change is all that is required to operate the tunnel diode in the switching mode. The negative resistance portion of the I–E characteristic is an unstable region if the total series circuit positive resistance of the circuit including the tunnel diode is greater than the negative resistance of the tunnel diode. Therefore, the tunnel diode can only switch through the negative conductance region to either of two stable states.

Figure 2:
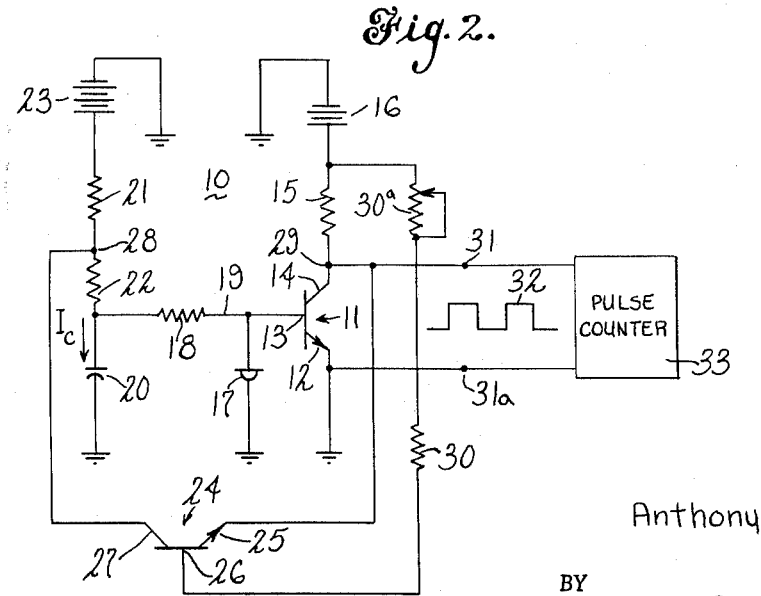
FIG. 2 is a schematic diagram of an oscillator circuit constructed in accordance with the invention.

A first preferred pressure measuring network constructed in accordance with the invention is illustrated in FIG. 2. This network generally indicated by the reference numeral 10 comprises a controlled semiconductor switching device illustrated as transistor 11 having emitter, base and collector electrodes 12, 13 and 14, respectively. The emitter-collector circuit of transistor 11 is connected in series with a current limiting resistor 15 between ground and a source of unidirectional potential, indicated by battery 16. Connected across the emitter-base circuit of transistor 11 is a tunnel diode 17 having one electrode connected through a resistance 18 in line 19 to a capacitor 20 which provides a timing function. Line 19 also connects resistor 18 and tunnel diode 17 to base 13. Capacitor 20 is serially connected with resistances 21 and 22 between a unidirectional potential source, indicated by a battery 23, and ground. A second transistor 24 having emitter, base and collector electrodes 25, 26 and 27, respectively, has its collector-emitter circuit connected between terminal 28 between resistances 21 and 22 and the collector 14 of transistor 11 at terminal point 29. The base electrode 26 of transistor 24 is connected through a range setting resistor 30 and a variable resistance of potentiometer 30a to battery 16.

The network 10 is effectively that of a relaxation oscillator producing a square wave output at terminals 31 and 31a connected across the emitter-collector circuit of transistor 11.

In accordance with the invention tunnel diode 17 acts as a pressure sensitive switch to control the ON and OFF conducting times of transistor 11. Tunnel diode 17, when switching from the low voltage state $E_P$ to a high voltage state $E_M$, establishes a forward bias on the base-emitter circuit of transistor 11 and turns transistor 11 ON, where it conducts in a saturated state. When transistor 11 is turned ON terminal 29 at the collector 14 thereof is effectively connected to ground as is emitter 25 of transistor 24. Capacitor 20 may then discharge through resistance 22, the collector-emitter circuit of transistor 24, and the collector emitter circuit of transistor 11 to ground. When the capacitor 20 discharges to the point where the current through the tunnel diode falls to a value which switches the tunnel diode back to the low voltage state $E_P$, the potential at the base 13 of transistor 11, with respect to ground, is insufficient to maintain conduction of transistor 11, and transistor 11 is turned OFF. Capacitor 20 then charges through resistances 21 and 22 until the current through the tunnel diode reaches a peak value $I_P$ which switches the tunnel diode to a high voltage state $E_M$ turning the transistor 11 ON to begin another cycle. In accordance with the invention, the tunnel diode in switching between voltage states interrupts the charge or discharge cycle of the capacitor and hence sets the frequency of oscillation dependent on the value peak and valley currents of the tunnel diode. Therefore, the frequency of oscillation depends on the pressure to which the tunnel diode is subjected.

In order to linearize the characteristics of the capacitor charging and discharging times, the charging or discharging current must be constant. To insure a constant capacitor charging current $I_C$, resistance 21 is made large in value and the voltage source indicated by the battery 23 is also selected to be of such potential that the capacitor sees the resistance 21 and the voltage source as a constant current source. This constant current source provides a charging current $I_C$ that is constant with respect to time. The value of resistance 18 is selected so that the current through the tunnel diode reaches its peak values $I_P$ before capacitor 20 is completely charged. This ensures that the tunnel diode switches to its high voltage state $E_M$ and causes transistor 11 to conduct in a saturated state when the voltage $E_M$ of the tunnel diode is applied to the base. The transistor 11 conducts in a saturated state when the voltage $E_M$ of the tunnel diode is applied to base 13. Therefore, resistance 15 is selected to have a value such that the product of its resistance value and the collector current of transistor 11 is greater than the value of the voltage applied across transistor 11 when the base-emitter voltage of transistor 11 is equal to the voltage $E_M$ of the tunnel diode. It may be seen that when transistor 11 is switched ON, to a conducting state, the emitter 25 of transistor 24 is effectively connected to ground through the collector-emitter circuit of transistor 11, thereby allowing transistor 24 to conduct and discharge capacitor 20.

To ensure that the discharge current of capacitor 20 is constant, with respect to time, the base current of transistor 24 is set with variable resistance 30a so as to produce a constant discharging current. Resistance 30 is a range setting resistor and prevents voltage from being applied directly to base 26 while the base drive is being set. Inasmuch as the tunnel diode I-E characteristic, as illustrated in FIG. 1, varies with the pressure to which the tunnel diode is subjected, the change in the value of $I_P$ and $I_V$ with change in pressure to which the tunnel diode is subjected establishes the point in the charging and discharging cycles of capacitor 20 where switching of tunnel diode 17 occurs. This may be shown mathematically as follows, where charging current $I_C$ is not constant:

$$t_c = \frac{(R_{21}+R_{22})R_{18}C}{R_{21}+R_{22}+R_{18}} \cdot \ln\left[1 - \frac{(R_{21}+R_{22}+R_{18})}{V_{23}}\right]I_p \quad (1)$$

$$t_d = \frac{R_{22}R_{18}C}{R_{22}+R_{18}} \cdot \ln \frac{I_V}{I_P} \quad (2)$$

$$T = t_c + t_d = \frac{1}{f} \quad (3)$$

where $R_{21}$=resistance value of resistance 21
$R_{22}$=resistance value of resistance 22
$R_{18}$=resistance value of resistance 18
$C$=capacitance value of capacitance 20
$V_{23}$=the voltage of battery 23
$t_c$=charging time of capacitor 20
$t_d$=discharging time of capacitor 20
$T$=period of oscillation
$f$=frequency of oscillation This illustrates that both the capacitor charging time and discharging time vary with the peak current $I_P$ and the discharging time varies with valley current $I_V$. The change in the tunnel diode characteristics with pressure changes the values of the peak and valley currents, as indicated by characteristics B and C (FIG. 1), respectively. This in turn establishes the point in the capacitor charging and discharging cycles where switching of the tunnel diode occurs.

Therefore, when capacitor 20 is made to charge and discharge at a constant rate, the point in the charge and discharge cycles at which the current through the tunnel diode switches from one voltage state to another depends upon the hydrostatic pressure to which the tunnel diode is subjected. Therefore, the repetition rate or frequency of switching of transistor 11 between ON and OFF conducting states is proportional to the pressure to which the tunnel diode is subjected.

When the tunnel diode switches between its high and low voltage states it interrupts charging and discharging of capacitor 20 and therefore changes the repetition rate or frequency of switching of transistor 11.

The voltage appearing across capacitor 20 will have a saw-tooth wave form. The switching of transistor 11 between OFF and ON conducting states will produce a rectangular wave form voltage indicated by the reference numeral 32, across transistor 11 and hence output terminals 31 and 31a. The output terminals 31 and 31a may be connected to a pulse counter 33 or other frequency measuring device, shown in block form, which may have an indicator and a scale calibrated in terms of pressure.

Figure 3:
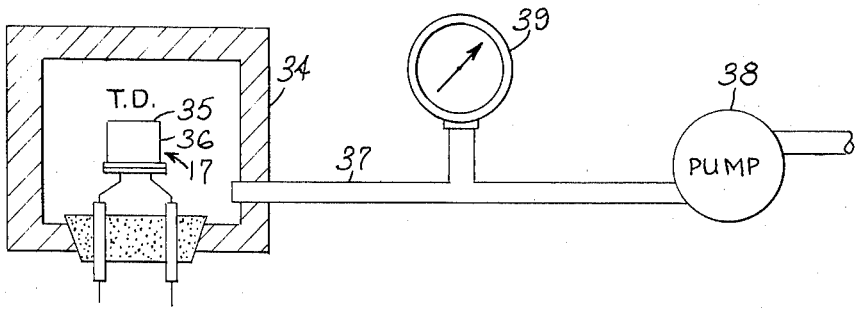
FIG. 3 illustrates a pressure cell which may be utilized in practicing the invention.

In practice, the tunnel diode may be enclosed in a pressure cell 34, as illustrated in FIG. 3 and subjected to hydrostatic pressure within cell 34 by means of a conduit 37 providing communication between the interior of cell 34 and the ambient environment of a hydrostatic pressure source 38. Alternately, the cell 34 might be connected in a conduit to measure the pressure of a fluid therein.

Figure 4:
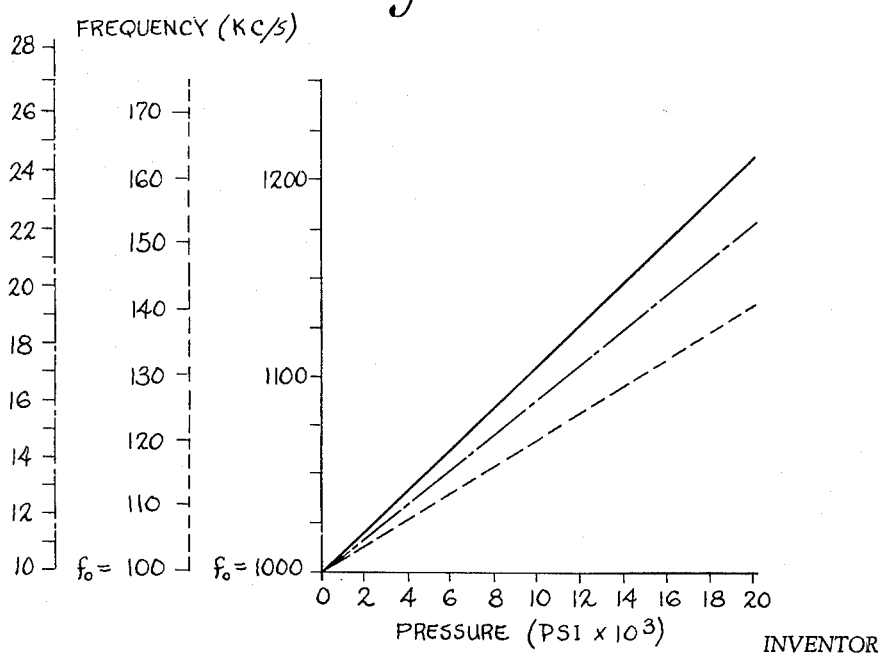
FIG. 4 illustrates the pressure-frequency characteristics of a network embodying the invention.

The invention provides a very accurate pressure-to-frequency transducing arrangement. FIG. 4 illustrates curves of output frequency versus hydrostatic pressure applied to a tunnel diode in the circuit configuration of FIG. 2. It will be noted that these curves illustrate a very precise linear relationship between pressure and frequency.

In obtaining the curves of FIG. 4, a network was constructed as disclosed in FIG. 2, in which a germanium tunnel diode was placed in a pressure cell 34 as illustrated in FIG. 3. The top 35 of the can 36 covering the tunnel diode was carefully removed and the can was filled with silicone grease. The tunnel diode 17 was the only element of the circuitry exposed to hydrostatic pressure. Hydrostatic pressure was applied to the interior of the cell 34 through conduit 37 using an air operated hydraulic pump 38, thus permitting the setting of the air pressure to hold a given hydrostatic pressure during the taking of the readings from which the curves of FIG. 4 were obtained. A pressure gauge 39 was carefully calibrated and was used to measure the pressure in the cell. The voltages applied to the circuit were well regulated and instrumented.

The frequency variation with pressure was plotted at various atmospheric pressures to which the tunnel diode was subjected, with base frequencies $f_o$ ranging from 10 kilocycles per second (kc./s.) to 1000 kc./s. It will be noted from FIG. 4, that the shift in frequency per pound per square inch pressure increased with increasing base frequencies $f_o$. However, within given frequency ranges as illustrated by the curves of FIG. 4, the frequency shift with change in pressure was linear.

The curves of FIG. 4 were obtained using a network as disclosed in FIG. 2 wherein the components were of the following types and values:

| | |
|---|---|
| Transistor 11 | 2N1605. |
| Transistor 24 | 2N1605. |
| Tunnel diode 17 | 1N2941 (5 ma.). |
| Resistor 15 | 4700 ohms. |
| Resistor 21 | 4700 ohms. |
| Resistor 22 | 100 ohms. |
| Resistor 18 | 10,000 ohms. |
| Potentiometer 30a | 100 ohms (max.). |
| Voltage Source 16 | 24 volts. |
| Voltage Source 23 | 12 volts. |
| Capacitor 20 | 1,500 $\mu\mu f$. |
| Pulse Counter 33 | Hewlett-Packard Model 524C—10 megacycles/second. |

All resistors were ±10% and capacitor 17 was of the low-drift silver mica type. The tunnel diode was of germanium. Silicon tunnel diodes may also be used. However, the output frequency, when using a silicon tunnel diode, will vary inversely with pressure since the peak current of a silicon tunnel diode increases with application of pressure thereto.

Figure 5:
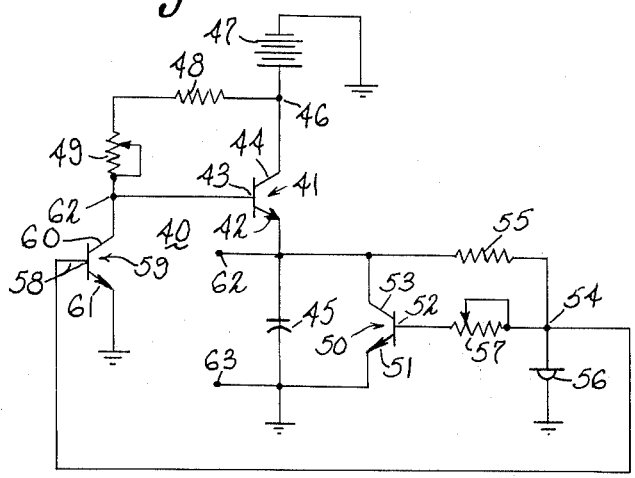
FIG. 5 is a schematic diagram of a second pressure-sensitive oscillator circuit constructed in accordance with the invention.

FIG. 5 illustrates another network 40 embodying the invention. A transistor 41 having emitter, base and collector electrodes 42, 43 and 44, respectively, has its collector-emitter circuit in series with a capacitor 45 between a terminal 46 and ground. Terminal 46 is adapted to be connected to a source of unidirectional potential indicated by battery 47. Transistor 41 is normally biased in a conductive state by virtue of the connection of collector 44 to base 43 through resistance 48 and a potentiometer or variable resistance 49. Connected across capacitor 45 is the collector-emitter circuit of a transistor 50 having emitter, base and collector electrodes 51, 52 and 53, respectively. The collector 53 of transistor 50 is connected to a terminal point 54 through a resistance 55. A tunnel diode 56 is connected between terminal point 54 and ground. Connected between base 52 and terminal 54 is a potentiometer or variable resistance 57. Connected to terminal point 54 is the base electrode 58 of a transistor 59 also having collector and emitter electrodes 60 and 61, respectively. Collector electrode 60 is connected at a terminal point 62 to variable resistance 49 and base 43 of transistor 41. Emitter 61 is connected to ground. The operation of the circuit of FIG. 4 is as follows: capacitor 45 charges at a linear rate through the collector-emitter circuit of transistor 41. The rate of charge is determined by the bias on base 43 as set by resistance 48 and variable resistance 49. Transistor 41 is the only transistor conducting during the charging cycle. As the voltage across capacitor 45 rises, the emitter of transistor 41 becomes back biased and transistor 41 ceases to conduct. When the voltage across capacitor 45 rises to a value such that the current through the tunnel diode reaches a peak value and switches to a high voltage state $E_M$, the rise in voltage at terminal 54 raises the potential of base 58 of transistor 59, rendering transistor 59 conductive. When transistor 59 becomes conductive, the potential of base 43 is lowered, essentially to ground, further back biasing transistor 41. The rise in voltage at terminal 54 also biases transistor 50 conductive thus providing a discharge path to ground for capacitor 45 through the collector-emitter circuit of transistor 50. The rate of discharge is determined by the setting of variable resistance 57 which determines the base current of transistor 50. Capacitor 45 will discharge linearly, and as it discharges, the current through tunnel diode 56 will decrease and the voltage across the tunnel diode will switch back to the low voltage state $E_V$ when the current through the tunnel diode decreases to the value of the valley current $I_V$. When the tunnel diode switches back to its low voltage state the voltage at terminal 54 decreases and this decrease in voltage turns off transistors 50 and 59. Transistor 41 then again becomes conductive and charging current flows to capacitor 45. Thereafter, the above-described cycle is repeated.

With increase in pressure the peak and valley currents in the tunnel diode change as exemplified in the characteristics of FIG. 1, which changes the voltages at which tunnel diode 56 switches between low and high voltage states and hence the frequency of oscillation.

Figure 6:
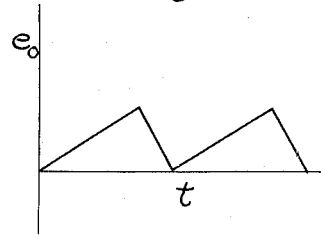
FIG. 6 illustrates the output voltage wave form of the circuit of FIG. 5.

The wave form of the output voltage $e_o$ of the network 40, across terminals 62 and 63, with respect to time $t$, is illustrated in FIG. 6. The wave form, as illustrated, is that of a saw tooth in which the rising edge is determined by the charging current and therefore the resistance value of variable resistance 49. The slope of the trailing edge is determined by the rate of discharge of capacitor 45 and thereby by the resistance value of variable resistance 57. Inasmuch as the peak and valley currents of the tunnel diodes will vary with hydrostatic pressure, the switching times of the tunnel diodes vary therewith to determine the times of capacitor charge and discharge and therefore the output saw tooth wave form varies in time as represented by a change in frequency.

The output terminals 62 and 63 may be connected to any suitable frequency measuring device or utilization device, not shown, which will measure the frequency of the output wave form and provide an indication thereof or actuate a utilization device in response thereto.

Figure 7:
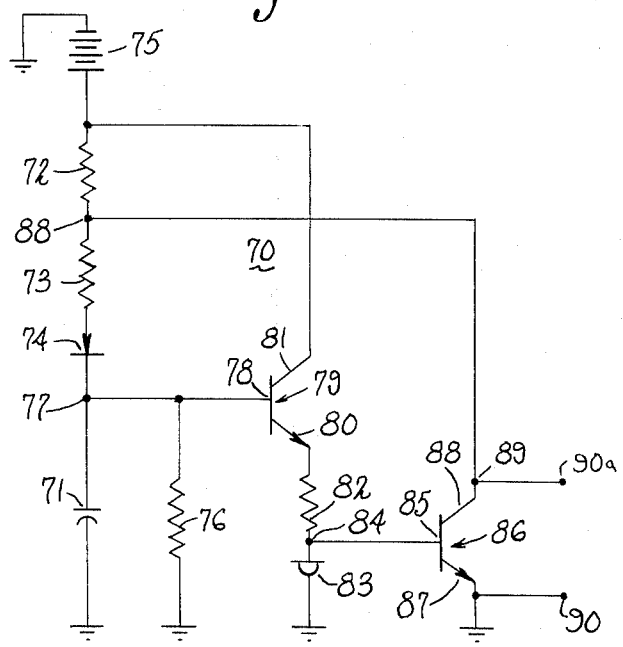
FIG. 7 is a schematic diagram of another pressure-sensitive oscillator circuit embodying the invention.

Another network 70 embodying the invention is illustrated in FIG. 7. Network 70 comprises a capacitor 71 serially connected with resistances 72 and 73 and diode 74 between a source of unidirectional potential, illustrated as battery 75, and ground. A resistance 76 is connected across capacitor 71 at terminal point 77, which is also connected to base 78 of a transistor 79. Transistor 79 has its collector 81 and emitter 80 serially connected with a current limiting resistance 82 and a tunnel diode 83 between battery 75 and ground. Tunnel diode is connected from terminal point 84 to the base 85 of transistor 86, across the base-emitter circuit. Emitter 87 of transistor 86 is connected to ground and collector 88 is connected to terminal point 89 so that current from battery 75 flows in the collector-emitter circuit of transistor 86 through resistor 72, which provides a current limit.

In operation, capacitor 71 charges from battery 75 through resistances 72 and 73 and diode 74 linearly toward the voltage of battery 75. Transistor 79 is conductive and as the voltage across capacitor 71 increases, the current through the collector-emitter circuit of transistor 79 follows the voltage build up across capacitor 71. It will be noted that transistor 79 is connected in an emitter follower arrangement. When the current through tunnel diode 83 increases to a peak value or a predetermined value close to the peak value, the voltage thereacross switches to a high level state which is sufficient to trigger transistor 86 into conduction in a saturated condition. When transistor 86 becomes conductive, terminal 89 is essentially connected to ground. Also, when the tunnel diode switches to a high voltage state, capacitor 71 discharges to ground through resistance 76 and through the base-emitter circuit of transistor 80. Diode 74 isolates capacitor 71 from the charging circuit during discharge thereof. When the current through transistor 79 and hence tunnel diode 83 decreases to a value where tunnel diode 83 switches to a low voltage state, the voltage across the base-emitter circuit of transistor 86 is insufficient to sustain conduction of transistor 86 and transistor 86 is turned off. When transistor 86 is turned off, capacitor 71 again commences to charge and the aforementioned cycle is repeated.

The peak and value currents of the tunnel diode 83 determine the length of the charging and discharging cycles of capacitor 71. Transistor 79, used as an emitter follower permits the use of a smaller portion of the capacitor charge and discharge cycles, which therefore provides greater linearity in the change of voltage across capacitor 71 with respect to time. This emitter follower arrangement does not affect the time of the charging or discharging circuits since the voltage across the tunnel diode follows the voltage across the capacitor. In this arrangement the current through the tunnel diode is dependent on the state of charge of the capacitor, but the tunnel diode does not load the capacitor. Therefore, large tunnel diode switching currents have little effect on the timing of the circuit. Moreover, with tunnel diodes having a current capacity of one milliampere, the linearity of the saw tooth wave appearing across capacitor 71 can be made considerably better than .5%. The output wave form of network 70 is taken from terminals 90 and 90a connected across the collector-emitter circuit of transistor 86.

The output wave form appearing across terminals 89 and 90 will be a series of rectangular pulses having a repetition rate dependent upon the peak and valley currents of the tunnel diode I–E characteristic and hence the hydrostatic pressure to which tunnel diode 83 is subjected. Output terminals 89 and 90 may be connected to any suitable frequency measuring device, pulse counting device or frequency sensitive utilization device, not shown, which will measure the frequency or repetition of the output wave form and provide an indication thereof or actuate a utilization device in response thereto.

A network as disclosed in FIG. 7 may have the following component types and values:

| Component | Value |
|---|---|
| Transistor 79 | 2N1605 |
| Transistor 86 | 2N1605 |
| Tunnel Diode 83 (1 ma.) | 1N2941 |
| Diode 74 | CTP462 |
| Resistance 72 | 4700 ohms |
| Resistance 73 | 470 do |
| Resistance 76 | 4700 do |
| Resistance 82 | 970 do |
| Voltage source 75 | 12 volts |
| Capacitor 71 | 1500 $\mu\mu f$ |

In practice, the tunnel diodes used in the invention may be disposed in a pressure cell such as illustrated in FIG. 3 to provide a means for applying hydrostatic pressure thereto or otherwise disposed in an atmosphere or environment of the pressure to be measured. In most instances the remainder of the circuitry will not be exposed to the hydrostatic pressure being measured. While the transistors illustrated in the various embodiments of the invention have been illustrated as being of the NPN type, it is to be understood that circuit configurations using the PNP type may also be constructed in accordance with the invention.

It may thus be seen that the invention provides a pressure measuring apparatus and network which efficiently attains the objects of the invention set forth as well as those made apparent from the foregoing discussion.

While preferred embodiments of the invention have been set forth for purposes of disclosure, other embodiments of the invention as well as modifications to the disclosed embodiments may occur to those skilled in the art which do not depart from the spirit and scope of the invention. Accordingly, it is intended that the appended claims cover all embodiments and modifications of the invention which do not depart from the spirit and scope of the invention.

What is claimed is:

1. Pressure measuring apparatus comprising a tunnel diode having a pressure sensitive current-voltage characteristic defining high and low voltage states and being effective to switch between said voltage states dependent on the magnitude of current therethrough, the current-voltage characteristic of said tunnel diode having peak and minimum current levels which vary with hydrostatic pressure applied to said tunnel diode and which determine the high and low voltage states; means for subjecting said tunnel diode to hydrostatic pressure to be measured; a capacitor, a first circuit path for charging said capacitor at a linear rate; circuit means electrically connecting said tunnel diode to sense the voltage across said capacitor whereby the current through said tunnel diode varies with the voltage across said capacitor and switches the voltage across said tunnel diode between high and low voltage states in response to predetermined changes in the current; a second circuit path independent of said first circuit path for discharging said capacitor, said second circuit path including means for maintaining the discharge current of said capacitor constant to discharge said capacitor at a linear rate; means responsive to switching of said tunnel diode to a high voltage state for interrupting charging of said capacitor through said first circuit path and causing discharge thereof through said second circuit path; and means responsive to switching of said tunnel diode to a low voltage state to interrupt discharging of said capacitor through said second circuit path and causing charging thereof through said first circuit path so that a voltage of saw-tooth wave form having a period proportional to the pressure applied to said tunnel diode is generated across said capacitor.

2. Pressure measuring apparatus comprising a tunnel diode having a pressure sensitive current-voltage characteristic defining high and low voltage states and being effective to switch between said voltage states dependent on the magnitude of current therethrough, the current-voltage characteristic of said tunnel diode having peak and minimum current levels which vary with hydrostatic pressure applied to said tunnel diode and which determine the high and low voltage states; a capacitor, a first circuit path for charging said capacitor at a linear rate; circuit means electrically connecting said tunnel diode to sense the voltage across said capacitor whereby the current through said tunnel diode varies with the voltage across said capacitor and switches the voltage across said tunnel diode between high and low voltage states in response to predetermined changes in the current; a second circuit path independent of said first circuit path for discharging said capacitor, said second circuit path including means for maintaining the discharge current of said capacitor constant to discharge said capacitor at a linear rate; means responsive to switching of said tunnel diode to a high voltage state for interrupting charging of said capacitor through said first circuit path and causing discharge thereof through said second circuit path; means responsive to switching of said tunnel diode to a low voltage state to interrupt discharging through said second circuit path of said capacitor and causing charging thereof through said first circuit path so that a voltage of saw-tooth wave form having a period proportional to the pressure applied to said tunnel diode is generated across said capacitor;

and means for measuring the frequency of the saw-tooth wave form voltage.

3. The apparatus of claim 2 including a transistor having a control electrode and two other electrodes, said control electrode and one of said other electrodes being connected across said tunnel diode, the second of said other electrodes being connectable to a source of potential whereby said transistor is switched ON and OFF in response to switching of said tunnel diode between voltage states and the discharge circuit path for said capacitor includes a second transistor having its collector and emitter circuit connected to the collector-emitter circuit of said transistor, said second transistor being arranged to discharge said capacitor through said transistor when said tunnel diode switches said transistor ON.

4. Pressure measuring apparatus comprising a tunnel diode having a pressure sensitive current-voltage characteristic defining high and low voltage states and being effective to switch between said voltage states dependent on the magnitude of current therethrough, the current-voltage characteristic of said tunnel diode having peak and minimum current levels which vary with hydrostatic pressure applied to said tunnel diode which determine the high and low voltage states; a capacitor; a first circuit path for charging said capacitor at a linear rate; circuit means electrically connecting said tunnel diode to sense the voltage across said capacitor whereby the current through said tunnel diode varies with the voltage across said capacitor and switches the voltage across said tunnel diode between high and low voltage states in response to predetermined changes in the current, a second circuit path independent of said first circuit path for discharging said capacitor, said second circuit path including means for maintaining the discharge current of said capacitor constant to discharge said capacitor at a linear rate; means responsive to switching of said tunnel diode to a high voltage state for interrupting charging of said capacitor and causing discharge thereof; means responsive to switching of said tunnel diode to a low voltage state to interrupt discharging of said capacitor and causing charging thereof, so that a voltage of saw-tooth wave form having a period proportional to the pressure applied to said tunnel diode is generated across said capacitor; and a voltage responsive semi-conductor switching device electrically connected to said tunnel diode and connectable to a source of unidirectional potential, said switching device being effective to switch between conducting and nonconducting states in response to switching of said tunnel diode between high and low voltage states.

5. The apparatus of claim 4 further comprising means for measuring the frequency of switching of said switching device.

6. Pressure measuring apparatus comprising a tunnel diode having a pressure sensitive current-voltage characteristic defining high and low voltage states and being effective to switch between said voltage states in response to the current therethrough reaching peak and minimium values; a capacitor, a first circuit path for charging said capacitor at a linear rate; circuit means electrically connecting said tunnel diode to sense the voltage across said capacitor whereby the current through said tunnel diode varies with the voltage across said capacitor and said tunnel diode switches between said voltage states in response to predetermined changes in current therethrough; a second circuit path independent of said first circuit path for discharging said capacitor, voltage responsive switching means electrically connected to said tunnel diode, said switching means being effective to switch between two conducting states in response to said tunnel diode switching between high and low voltage levels so that the frequency of said switching of said device is proportional to the pressure to which said tunnel diode is subjected, said second circuit path including means operative when said tunnel diode is in a high voltage state to maintain discharge current flow from said capacitor constant to discharge said capacitor at a linear rate.

7. Pressure measuring apparatus comprising a tunnel diode having a pressure sensitive current-voltage characteristic defining high and low voltage states and being effective to switch between said voltage states in response to the magnitude of current therethrough; a series circuit comprising the collector and emitter of a first transistor and said tunnel diode; another circuit path comprising a capacitor and means for charging said capacitor at a linear rate; circuit means connecting said capacitor across the base and emitter electrodes of said first transistor and said tunnel diode whereby said transistor is forward biased as said capacitor is charged; and switching means electrically connected to said tunnel diode to sense switching of said tunnel diode between high and low voltage levels and switch between two conducting states in response thereto.

8. The apparatus of claim 7 including means for measuring the frequency of switching of said switching device.

9. A pressure measuring network comprising a capacitor, a tunnel diode having a pressure sensitive voltage-current characteristic defining peak and minimum current values which vary with hydrostatic pressure applied to said tunnel diode, said tunnel diode being effective to switch between high and low voltage states when the current therethrough reaches said current values, said tunnel diode being connected across said capacitor to sense the voltage across said capacitor and to switch between high and low voltage states when the current therethrough reaches the peak and minimum values on the characteristic; a circuit for charging said capacitor; a circuit for discharging said capacitor, said discharging circuit being independent of said charging circuit; said discharging circuit including a normally nonconductive transistor said tunnel diode being operatively coupled to said transistor to render said transistor conductive and discharge said capacitor at a constant rate when said capacitor charges to a voltage sufficient to produce a current through said tunnel diode effective to switch said tunnel diode to a high voltage state; switching means operatively connected to said tunnel diode and adapted to switch between conducting and nonconducting states in response to said tunnel diode switching between high and low voltage states and means for measuring the frequency of switching of said switching device.

10. Pressure measuring apparatus comprising a tunnel diode having a pressure sensitive current-voltage characteristic defining high and low voltage states and being effective to switch between said voltage states dependent on the magnitude of current therethrough, the current-voltage characteristics of said tunnel diode having peak and minimum current levels which vary with hydrostatic pressure applied to said tunnel diode and which determine the high and low voltage states a capacitor, a first circuit path for charging said capacitor; circuit means electrically connecting said tunnel diode to sense the voltage across said capacitor whereby the current through said tunnel diode varies with the voltage across said capacitor and switches the voltage across said tunnel diode between high and low voltage states in response to predetermined changes in the current; a second circuit path independent of said first circuit path for discharging said capacitor, said second circuit path including means for maintaining the discharge current of said capacitor constant to discharge said capacitor at a linear rate; means responsive to switching of said tunnel diode to a high voltage state for interrupting charging of said capacitor through said first circuit path and causing discharge thereof through said second circuit path; and means responsive to switching of said tunnel diode to a low voltage state to interrupt discharging of said capacitor through said second circuit path and causing charging thereof through said first circuit path, so that a voltage of saw-tooth wave form having a period proportional to the pressure applied to said tunnel diode is generated across said capacitor; and means for subjecting said tunnel diode to hydrostatic pressure to be measured.

11. The apparatus of claim 10 wherein said second circuit path includes the collector-emitter circuit of a transistor, said transistor being biased to maintain current therethrough constant when said tunnel diode is in a high voltage state.

References Cited by the Examiner

UNITED STATES PATENTS

| | | | |
|---|---|---|---|
| 3,063,023 | 11/1962 | Dacey et al. | 73—88.5 |
| 3,065,636 | 11/1962 | Pfann | 73—88.5 |
| 3,071,725 | 1/1963 | McWaid | 73—398 X |

OTHER REFERENCES

"General Electric Tunnel Diode Manual," Semiconductor Products Department, General Electric Company, Kelly Building, Liverpool, New York, March 20, 1961, first edition, page 47.

Rogers, E. S.: "Experimental Tunnel-Diode Electromechanical Transducer Elements and Their Use in Tunnel-Diode Microphones," The Journal of the Acoustical Society of America, vol. 34, No. 7, July 1962, pages 883 to 893.

RICHARD C. QUEISSER, *Primary Examiner.*